(12) United States Patent
Yamaguchi

(10) Patent No.: US 6,977,768 B2
(45) Date of Patent: Dec. 20, 2005

(54) PHOTONIC CRYSTAL, METHOD OF PRODUCING PHOTONIC CRYSTAL, AND FUNCTIONAL ELEMENT

(75) Inventor: Yasuhiro Yamaguchi, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 135 days.

(21) Appl. No.: 10/396,359

(22) Filed: Mar. 26, 2003

(65) Prior Publication Data

US 2004/0036814 A1  Feb. 26, 2004

(30) Foreign Application Priority Data

Aug. 20, 2002  (JP) .............................. 2002-239234

(51) Int. Cl.[7] .......................... G02F 1/355; B32B 33/00
(52) U.S. Cl. ...................... 359/326; 156/234; 156/235; 156/241
(58) Field of Search ........ 359/326–332; 385/129–131; 156/152, 230, 234, 235, 241

(56) References Cited

U.S. PATENT DOCUMENTS 6,465,742 B1 * 10/2002 Hiraoka et al. ............. 174/255

2003/0020501 A1 * 1/2003 Aoki et al. .................. 324/754

OTHER PUBLICATIONS

Lin et al., *Nature*, vol. 394, pp. 251-253 (Jul. 1998).
Noda et al., *App. Phys. Lett.*, vol. 75, pp. 905-907 (Aug. 1999).
Kawakami, *Electron. Lett.*, vol. 33, pp. 1260-1261 (Jul. 1997).
Vos et al., *Science*, vol. 281, pp. 802-804 (Aug. 1998).
Misawa et al., *Appl. Phys. Lett.*, vol. 74, pp. 786-788 (Feb. 1999).
Busch et al., *Phys. Rev. Lett.*, vol. 83, pp. 967-970 (Aug. 1999).
Meier et al., *J. Appl. Phys.*, vol. 86, pp. 3502-3507 (Oct. 1999).

* cited by examiner

*Primary Examiner*—John D. Lee
(74) *Attorney, Agent, or Firm*—Oliff & Berridge, PLC

(57) ABSTRACT

A plurality of thin-film parts having predetermined patterns are formed on a mold-releasing layer on a donor substrate. Next, a photonic crystal is created by using an acceptor substrate to successively separate, from the mold-releasing layer on the donor substrate, each of the thin-film parts to which a mixture of an adhesive matrix material and a functional material has been supplied, and laminating and transferring the thin-film parts onto the acceptor substrate.

14 Claims, 4 Drawing Sheets

PHOTONIC CRYSTAL, METHOD OF PRODUCING PHOTONIC CRYSTAL, AND FUNCTIONAL ELEMENT

The present disclosure relates to the subject matter contained in Japanese Patent Application No.2002-239234 filed on Aug. 20, 2002, which is incorporated herein by reference in its entirety.

BACKGROUND OF THE INVENTION

1. Field of the Invention

The present invention relates to a photonic crystal that is useful in the fields of photonics and electromagnetic waves, to a method of producing the photonic crystal, and to a functional element utilizing the photonic crystal, such as a laser element, an optical switch, and a tunable filter.

2. Description of the Related Art

Refractive index periodic structures having a distribution in which the refractive index is periodic exhibit a diffractive/interfering action with respect to electromagnetic waves, and prohibit the propagation of electromagnetic waves of specific frequency bands. This phenomenon corresponds to band structures with respect to electrons in a semiconductor crystal. Generally, such refractive index periodic structures are called photonic crystals, and frequency bands that prohibit propagation are called photonic band gaps. The information technology industry that flowered at the end of the twentieth century was supported by electronics based on semiconductor materials that control electrons, but it is nearing an inherent technological limit. It is thought that, in order for further development in the twenty-first century, a move to photonics that can break through the limit of electronics is essential. Because photonic crystals can control electromagnetic waves, they are ranked as key materials in photonics similar to the way semiconductors are in electronics, and are promising as an important element for realizing next-generation optical devices such as ultra-efficient lasers and ultra-miniature optical integrated circuits.

In order for photonic crystals to function effectively, the photonic crystals must have a refractive index periodic structure of a spatial scale similar to that of the wavelength of the electromagnetic wave that is to be controlled, and it is necessary for the ratio of refractive index between a high refractive index phase and a low refractive index phase to be equal to or greater than a predetermined value. The lowest refractive index ratio sought differs in accordance with the configuration of the periodic structure, but generally the larger it is, the more preferable it is. In the field of photonics, because the target wavelength region is generally from the visible light region to the near infrared region, photonic crystals having a period from a submicron order to micron order must be created. As a method for realizing this, an example has been disclosed by Lin et al in which semiconductor microfabrication technology is used to create a woodpile-like photonic crystal in which blocks made of Si are stacked at periods of several microns (Nature, Vol. 394, pp. 251–253 (1998)). Also, wafer fusion has been disclosed by Noda et al as a method for creating a woodpile-like photonic crystal, in which blocks made of GaAs and InP are stacked at periods of several microns is created (App. Phys. Lett., Vol. 75, pp. 905–907 (1999)). Additionally, Kawakami et al have succeeded in the creation of a photonic crystal, by unique bias sputter deposition/etching, having a special 3-dimensional periodic structure of a submicron order comprising Si and $SiO_2$ (Electron. Lett., Vol. 33, pp. 1260–1261 (1997)), and they have called this method self-cloning.

Furthermore, Vos et al have created an inverse opal photonic crystal of a submicron order by depositing, by sol-gel, titania into the pores of an opal structure resulting from the self-assembly of polystyrene monodisperse particles, and removing the polystyrene particles of the mold by burning them at the same time as baking the titania (Science, Vol. 281, pp. 802–804 (1998)). Misawa et al have created, by 2-photon polymerization, a woodpile-like photonic crystal of a submicron order comprising a photocurable resin (Appl. Phys. Lett., Vol. 74, pp. 786–788 (1999)).

However, because Lin et al's method comprises many steps that combine complicated semiconductor microfabrication technology, there are problems in that a large apparatus is necessary, productivity is low, and costs are high. There are also few types of applicable materials, and the method cannot be said to be versatile. Noda et al's method is an extremely excellent method in that there are many types of applicable materials and there is a great amount of freedom with respect to structure. However, the extremely harsh condition of heating at about 700° C. in a hydrogen atmosphere is used in order to conduct wafer fusion, and there are problems with safety in the fabrication and the like. Kawakami et al's method is extremely excellent in that there are many types of applicable materials. However, there are serious problems in that some limited types of structures can be created and the method lacks versatility. Because opal and inverse opal photonic crystals are extremely simple to create, they are widely used in research activities at the laboratory level, but the amount of freedom with respect to structure is small, and breakthroughs in terms of production methods are essential when using them in a device. From theoretical calculations, the refractive index conditions necessary to form complete photonic band gaps in opal and inverse opal photonic crystals are predicted to be remarkably more severe than those necessary for woodpile-like photonic crystals, and are disadvantageous in terms of material selectability. With respect to inverse opal photonic crystals, it is necessary to fill a high refractive index material into the pores of the opal mold. However, there are problems in that it is difficult to evenly fill fine 3-dimensional pores and the mold becomes deformed in accompaniment with the filling. As a method for creating a photonic crystal using a photocurable resin, a method using ordinary optical molding has also been proposed in addition to the above-described 2-photon polymerization. Because the refractive index of the resin in the method using a photocurable resin is about 1.7 at best, which is low, there has been the problem that a large refractive index ratio cannot be obtained. In the method using 2-photon polymerization, an extremely expensive femtosecond laser must be used, and there is the problem that the method is ill-suited for commercial production. Optical molding is a method that is practically utilized for rapid prototyping in production processes for household electrical appliances, but resolution in current machines is low, and it impossible to use in the creation of photonic crystals of an optical wavelength region.

In recent years, functional materials have been incorporated into photonic crystals. Using reaction characteristics of functional materials with respect to an outside stimulus, there have been attempts to add new functions to photonic crystals to develop the photonic crystals into functional elements. For example, a photonic crystal has been 7 created by Busch et al, in which a liquid crystal material whose refractive index is changed in response to an electric field or heat is filled into the pores of an inverse opal photonic crystal (Phys. Rev. Lett., Vol. 83, pp. 967–970 (1999)). This photonic crystal can control the opening and closing of the photonic band gap by the application of an electric field, and can be applied as a functional element such as an optical switch or an imaging element. A photonic crystal has also been created by Meier et al, in which a light-emitting material that emits fluorescent or phosphorescent light due to light absorption is filled into the surface and pores of a honeycomb photonic crystal (J. Appl. Phys., Vol. 86, pp. 3502–3507 (1999)). This photonic crystal can be used as a photoexcitation laser element by the photonic crystal structure functioning as a resonator.

However, in each of the above-described cases, a method is adopted in which the functional material is filled after the photonic crystal structure has been created, but because it is difficult to homogenously fill the fine 3-dimensional pores of the photonic crystal structure with the functional material, the development of a production method that is simple and whose productivity is high has been sought after with the hope of practical application.

A versatile method of producing a photonic crystal having a desired refractive index and periodic structure, and a simple method of producing a photonic crystal that incorporates a functional material, have not been established yet. Therefore, photonic devices utilizing photonic crystals have not yet reached full-scale practical utilization.

SUMMARY OF THE INVENTION

The present invention has been devised in light of the aforementioned circumstances. It is an object of the invention to provide a photonic crystal and that of incorporating a functional material and a simple and versatile method of producing the photonic crystal. It is another object of the invention to inexpensively provide a functional element that utilizes the photonic crystal and is useful in the fields of photonics and electromagnetic waves.

The inventors employs as a refractive index periodic structure creatable by a simple and versatile production method, a refractive index periodic structure that includes a laminate of plural thin film parts having a predetermined pattern and an adhesive organic material that is filled into the pattern pores of each thin film part.

Also, the inventors discover that each of the aforementioned problems can be solved by using an adhesive matrix material as the adhesive organic material of the above refractive index periodic structure and adding a functional material to the inside of the adhesive matrix material. The functional material referred to herein is a material in which an alteration of physical properties and/or an alteration of structure thereof are/is induced in response to an outside stimulus such as heat or light.

That is, according to an aspect of the invention, a photonic crystal includes a plurality of elements having predetermined patterns and laminated and an adhesive matrix material. The adhesive matrix material is filled in pattern pores of the plurality of elements.

Also, according to another aspect of the invention, a photonic crystal includes a plurality of thin film parts having predetermined patterns and laminated, an adhesive matrix material, and a functional material. The functional material is induced at least one of an alternation of physical property and an alternation of structure in response to an external stimulus. The adhesive matrix material and the functional material are filled in pattern pores of the plurality of thin film parts. In this case, as described later, the functional material is not filled into 3-dimensional pores of the formed photonic crystal structure, but is only filled into 2-dimensional pattern pores of the thin-film parts. Therefore, the functional material can be filled homogenously. Because the functional material is used together with the adhesive matrix material, adhesiveness for firmly fixing the photonic crystal structure is not necessary for the functional material itself. Thus, the degree of freedom with which materials can be selected is remarkably improved.

Here, the induced alteration of physical property in the functional material may be an alteration of at least one of refractive index, dielectric constant, absorption intensity, absorption spectrum, and electric conductivity. Also, the structural alterations induced in the functional material may be at least one of contraction, extension, and bending. The functional material may include at least one of: alight-emitting material such as a fluorescent material, a phosphorescent material, an electric field light-emitting material, and a chemical light-emitting material; a nonlinear optical material; an electrochromic material; a thermochromic material; a photochromic material; and a smart gel material. The fluorescent material is preferably a fluorescent organic dye.

Also, material of the thin-film parts is selected from a group consisting of a metal, a ceramic, an inorganic semiconductor, and a crosslinking organic material. It should be noted that a ratio of refractive index between the material of the thin-film parts and the adhesive matrix material to which the functional material has been added is preferably 1.5 or greater, more preferably 1.8 or greater, and still more preferably 2.1 or greater.

Moreover, according to another aspect of the invention, a photonic crystal includes a plurality of elements having a predetermined pattern and laminated and an adhesive matix material. The adhesive matrix material is induced at least one of an alternation of physical property and an alternation of structure in response to an external stimulus. The adhesive matrix material are filled in pattern pores of the plurality of elements. In a case where the adhesive material itself includes functionality, it is not necessary to separately use a functional material.

According to still another aspect of the invention, a method of producing a photonic crystal, includes forming a plurality of elements having predetermined patterns on a donor substrate; supplying an adhesive matrix material and a functional material which is induced at least one of an alternation of physical property and an alternation of structure in response to an external stimulus; and successively separating by the acceptor substrate, from the donor substrate, each of elements to which the adhesive matrix material and the functional material have been supplied, and laminating and transferring each of elements onto the acceptor substrate.

Here, in the supplying step, the functional material may be supplied in one of a state in which the functional material is solubilized in the adhesive matrix material and a state in which the functional material is dispersed in the adhesive matrix material. In this case, the supply can be conducted by coating, using a solution or dispersion including the adhesive matrix material and the functional material Also, in the laminating and transferring step, at least one of light irradiation, heating, and pressurization may be conducted.

It is preferable to form in advance a mold-releasing layer comprising a material including fluorine atoms on a surface of the donor substrate. Using this production method, the photonic crystal described above can be suitably created.

Moreover, according to further another aspect of the invention, a method of producing a photonic crystal, includes forming a plurality of elements having predetermined patterns on a donor substrate; supplying an adhesive matrix material which is induced at least one of an alternation of physical property and an alternation of structure in response to an external stimulus; and successively separating by the acceptor substrate, from the donor substrate, each of elements to which the adhesive matrix material has been supplied, and laminating and transferring each of elements onto the acceptor substrate. In this production method, a material is used in which the adhesive material itself includes functionality.

By using the photonic crystal that incorporates the functional material, a functional element, such as a laser element, an optical switch, and a tunable filter, can be realized.

DETAILED DESCRIPTION OF THE PREFERRED EMBODIMENTS

Figure 1:
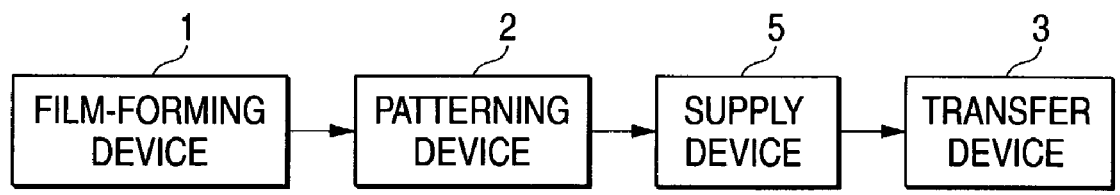
FIG. 1 is a block diagram illustrating an example of a production system pertaining to a production method of the invention.

FIG. 1 is a block diagram illustrating an example of production system for realizing a method of producing a photonic crystal according to an embodiment of the invention. The production system includes a film-forming device 1, a patterning device 2, a supply device 5, and a transfer device 3. The film-forming device 1 forms a thin film on a donor substrate. The patterning device 2 patterns the formed thin film into a desired pattern. The supply device 5 supplies an adhesive matrix material and a functional material onto the patterned plural thin-film parts. The transfer device 3 transfers and joins onto an acceptor substrate the plural thin-film parts to which the adhesive matrix material and the functional material have been supplied.

The film-forming device 1 is a subsystem that forms a thin film on the donor substrate, which includes an Si wafer, a glass substrate, a ceramic substrate, or aplastic substrate. The film-forming device 1 has a good ability to control the film thickness, and preferably uses a film-forming method in which film thickness uniformity is excellent across the entire substrate. Examples of the film-forming method include thermal deposition, electron beam deposition, ionization deposition, sputtering, ultrafine particle jet printing, MBE (molecular beam epitaxy), laser ablation, CVD (chemical vapor deposition), or dry film-forming methods such as lamination and embossing, or wet film-forming methods such as spin-coating, inkjet printing, plating, electroless plating, electrodeposition, electrophoretic deposition, CBD (chemical bath deposition), sol-gel, LB, liquid phase epitaxy, and injection molding.

Although an optional material can be used for the material structuring the thin film, it is preferable to use a material whose mechanical strength and heat resistance are higher than those of an organic material for adhesion. Examples of the material include: metals such as W, Pt, Au, Al, Ti, Ni, Zr, Cu, Fe, or alloys thereof; ceramics such as alumina, silica, titania, zirconia, magnesia, barium titanate, lithium niobate, ferrite, zinc oxide, ITO (indium tin oxide), FTO (fluorine-doped tin oxide), and zeolite; inorganic semiconductors such as Si, GaAs, InP, CdS, CdTe, GaN, $CuInS_2$, $CuInSe_2$, ZnS, FeS, and $FeSi_2$; crosslinking organic materials such as thermosetting resins and UV-curable resins; composite materials in which an inorganic material or an organic material has been dispersed in a resin; electrically conductive polymers; carbon; diamond; and SiC. Among these, metals, ceramics, inorganic semiconductors, and crosslinking organic materials are particularly preferable because they have excellent mechanical strength and heat resistance, and production methods for forming a thin film of high quality have been established.

Although the thickness of the film cannot be unconditionally prescribed because it will differ in accordance with the purpose of application, it is preferable to select a method most suited for obtaining the desired film thickness because the methods have different from each other in film thickness regions, which have a film of high quality. Also, although the range of allowance for unevenness in the thickness in the surface of the thin film cannot be unconditionally prescribed because it, too, will differ in accordance with the purpose of application, it is generally preferable for the range of allowance to be 20% or less of the predetermined film thickness, and more preferably 10% or less. As a method for suppressing film thickness unevenness in the surface, a method that smoothes the surface after film formation to a desired film thickness unevenness in the surface in accordance with an optional method such as CMP (chemical mechanical polishing) can be used, in addition to a method that controls the film-forming method and film-forming conditions at the time of film formation to form a film within a desired film thickness unevenness in the surface. It is also preferable to form in advance a mold-releasing layer having high mold-releasability on the surface of the donor substrate before the film is created by the film-forming device 1. The mold-releasing layer may be formed by depositing or coating a fluorocarbon resin or the like on the donor substrate surface, or by a method in which the substrate is heated and a thermally-oxidized film is formed on the surface, or by exposing the substrate surface to a gas including fluorine atoms and chemically fluorinating the substrate surface. By forming a thin film including fluorine atoms or fluorinating the surface, extremely high releasability can be obtained, and particularly preferable effects can be obtained.

The patterning device 2 divides the thin film into sets of plural thin-film parts using, for example, photolithography, liftoff, a focused ion beam (FIB), electron beam direct lithography, or mechanical machining, and imparts a desired pattern to the plural thin-film parts. Using photolithography, form precision of a submicron order can be obtained, and high commercial productivity can be realized. However, the creation of a photomask is essential, and photolithography is ill-suited for high-mix low-volume production. On the other hand, although FIB and electron beam direct lithography have the problem that the device used therefor is extremely expensive, optional forms can be directly lithographed with high precision by beam scanning, and it is not necessary to use a photomask. It should be noted that, although an example is shown in FIG. 1 in which the film-forming step and the patterning step are conducted separately, a method may also be used in which film-forming and patterning are conducted at the same time (e.g., a method in which a metal mask is used in deposition or CVD to deposit the thin film in a pattern). Various treatments may also be applied to the thin film after film formation and/or after patterning, such as heating, exposure to ultraviolet radiation, ozoning, and polishing.

After patterning has been applied, an optional method can be used as a method to supply the adhesive matrix material and the functional material to the pores thereof and/or the surface. For example, if both the adhesive matrix material and the functional material are solids, appropriate amounts thereof may be supplied directly, or indirectly by lamination, solid ink jetting, injection molding, or vapor deposition. In a case where both the adhesive matrix material and the functional material are dissolvable or dispersible in an appropriate solvent, they may be supplied by a wet coating method, such as spin-coating, ink jetting, immersion coating, or casting, using the solvent or dispersion. Although this supply operation may be conducted at one time for all of the plural thin-film parts, it may also be selectively conducted only at transfer portions for each transfer step. In a case where the supply operation is conducted per transfer step, the adhesive matrix material and the functional material may be supplied to the acceptor substrate and not to the thin-film parts. There are no limitations on the supplied amount of the adhesive matrix material as long as the amount is equal to or greater than an amount that is sufficient for adhering each thin-film part and each layer. However, it is preferable to supply an amount that is sufficient to fill the pores formed in accordance with the patterning of the thin film. The supplied amount of the functional material should be an amount that is sufficient and necessary to develop the expected function. However, the supplied amount cannot be unconditionally prescribed because the amount that is appropriate will differ for each functional material.

Any material can be used for the adhesive matrix material as long as it has adhesiveness and can enclose therein the functional material. However, it is preferable to use a plastic deformable organic polymer compound or an organic-inorganic complex sol-gel material under temperature and pressure conditions that do not cause the thin film to deform or break. These may also be used singly, or several maybe mixed and used. Specific examples of the organic polymer compound include: thermoplastic resins such as Arton resin made by JSR, acrylic resins, polyester resins, butyral resins, polyamide resins, and polycarbonate resins; thermosetting resins such as benzocyclobutene resins, phenol resins, and melamine resins; and ultraviolet-curable resins such as epoxy resins.

Any material can be used for the functional material as long as it is one in which alteration of its physical properties and/or structure are/is induced in response to an outside stimulus, and the material may be used singly or several materials may be mixed and used. Examples of the outside stimulus include: heat; pressure; electromagnetic waves such as X-rays, ultraviolet light, visible light, infrared light, THz waves, and microwaves; pH alteration; exposure to gas, solutes, or solvents; and charged particles such as electrons and ions. Examples of alterations of physical properties include changes in refractive index, dielectric constant, absorption intensity and/or spectrum, and electric conductivity. Examples of alterations of structure include contraction, extension, and bending. Materials that exhibit a light-emitting phenomenon due to photoexcitation, electric excitation, or chemical excitation are effective as the functional material. Specific examples of the functional material include: inorganic light-emitting materials such as porous silicon and ZnS, organic field light-emitting materials, phosphorescent organic dyes, and fluorescent organic dyes, which emit phosphorescent light or fluorescent light due to photoexcitation or electric excitation; nonlinear optical materials such as liquid crystal whose refractive index or dielectric constant is changed by an electric field or heat; electrochromic materials whose absorption spectrum is altered by electric field; thermochromic materials whose absorption spectrum is altered by heat; photochromic materials whose absorption spectrum is altered by light; and smart gel materials that expand and/or contract due to a change in pH or the incorporation of ions.

It is preferable that the functional material is used in a state in which it has been solubilized or a state in which it has been particle-dispersed in the adhesive matrix material. In a case where both the functional material and the adhesive matrix material are polymer compounds, it is preferable to select miscible materials or microphase separated materials. In a macrophase-separated combination, sometimes the combination does not function effectively as a photonic crystal. Optional materials other than the functional material and the adhesive matrix material can also be added as needed. It should be noted that, when the adhesive matrix material itself includes functionality, it is not necessary to separately use the functional material.

Figure 2:
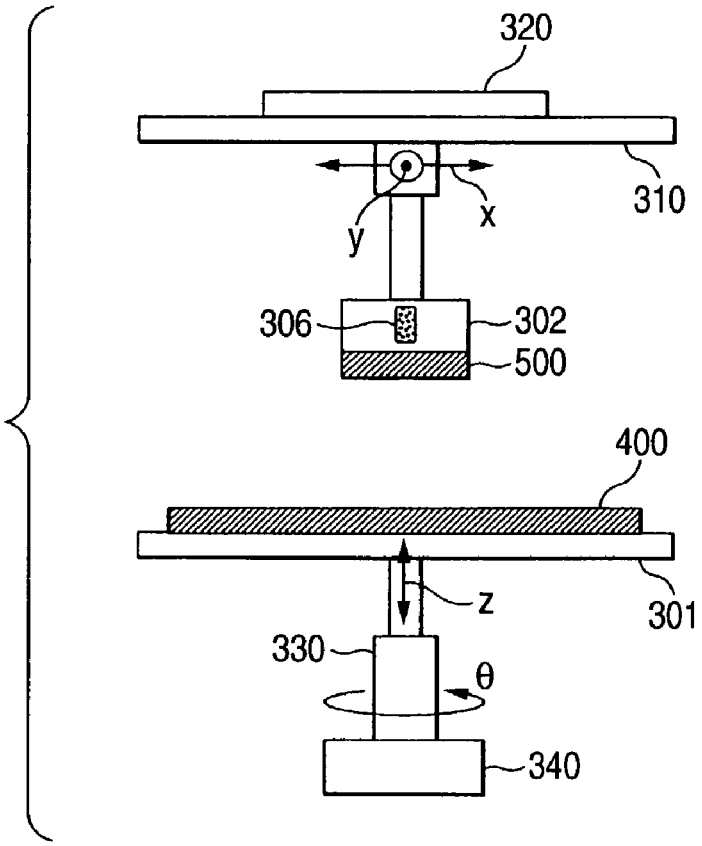
FIG. 2 is a pattern diagram illustrating an example of a transfer device pertaining to the production method of the invention.

FIG. 2 is a pattern structural diagram illustrating an example of the transfer device 3. The transfer device 3 includes: a substrate holder 301, on which is mounted a donor substrate 400; a stage 302, on which is mounted an acceptor substrate 500 to which a thin film formed on the donor substrate 400 is transferred; a mark detection unit 306 like a microscope that is attached to the stage 302 and detects alignment mark 403s (see FIG. 4) on the substrate 400; an x-axis table 310, which moves the stage 302 along an x-axis (in FIG. 2, a left-right direction) using an x-axis motor (not illustrated) and detects a position of the stage 302 on the x-axis using an x-axis position detection unit (not illustrated); and a y-axis table 320, which moves the stage 302 along a y-axis (in FIG. 2, a direction orthogonal to the page surface) using a y-axis motor (not illustrated) and detects a position of the stage 302 on the y-axis using a y-axis position detection unit (not illustrated). The acceptor substrate 500 comprises, for example, an Si wafer, a glass substrate, a ceramic substrate, or aplastic substrate. The transfer device 3 also includes: a z-axis table 330, which moves the substrate holder 301 along a z-axis (in FIG. 2, a vertical direction) using a z-axis motor (not illustrated) and detects a position of the substrate holder 301 on the z-axis using a z-axis position detector (not illustrated); and a θ table 340, which rotates the substrate holder 301 around the z-axis using a θ motor (not illustrated) and also detects an angular position of the substrate holder 301 in the θ direction using a θ position detection unit (not illustrated) when alignment is adjusted. The x-axis position detection unit, the y-axis position detection unit, the z-axis position detection unit, and the θ position detection unit can be realized by using, for example, a laser interferometer or a glass scale.

Figure 3:
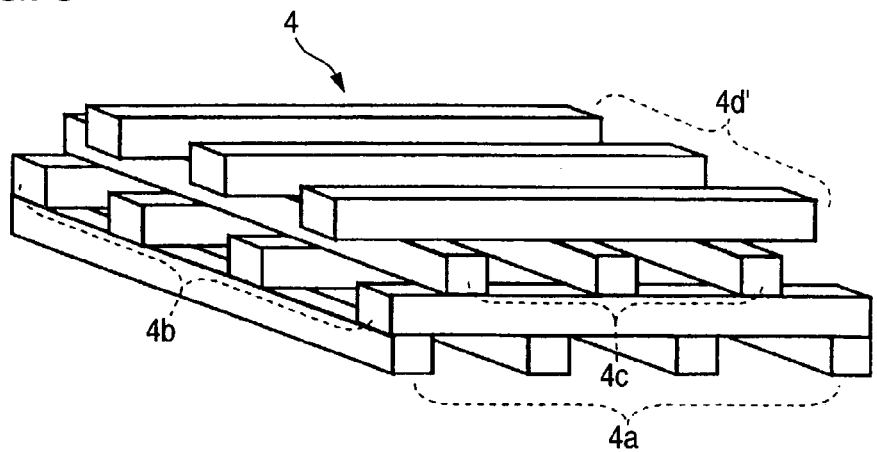
FIG. 3 is a partial perspective view illustrating an example of a photonic crystal of the invention.

Next, the operation of the production system will be described with reference to FIGS. 3 and 4. FIG. 3 is a partial perspective view of a photonic crystal created in the following examples. A photonic crystal 4 is one in which thin film parts 4a, 4b, 4c, and 4d, which comprise groups of blocks that have been two-dimensionally arranged in a stripe-like manner, have been stacked in a woodpile manner. In FIG. 3, the adhesive matrix material and the functional material (not illustrated) are filled into pores between each block group.

Figure 4A:
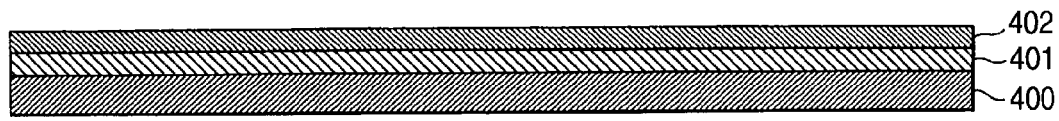
FIG. 4 are pattern diagrams illustrating an example of a film-forming step and a patterning step in the invention, with FIGS. 4A and 4B being cross-sectional views and FIG. 4C being a plane view.
Figure 4B:
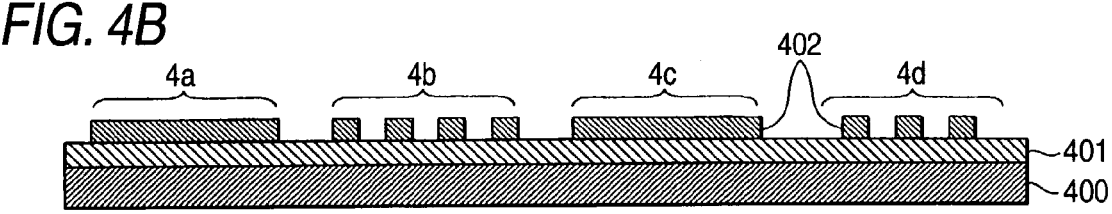
Figure 4C:
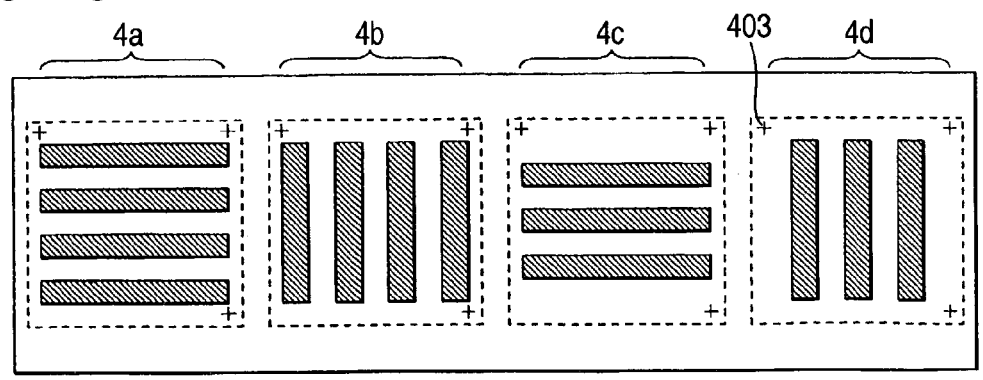

FIG. 4 are pattern diagrams illustrating an example of the film-forming step and the patterning step, with FIGS. 4A and 4B being cross-sectional views and FIG. 4C being a plane view. Details will be described below in the examples.

EXAMPLE 1

[1] Formation of Mold-Releasing Layer on Donor Substrate Surface: As shown in FIG. 4A, a quartz glass substrate was prepared as the donor substrate 400, the donor substrate 400 was introduced to a dry etching device, and a plasma treatment (gas flow rate: 100 sccm; discharge power: 500 W; pressure: 10 Pa; time: 10 min.) was conducted using $CF_4$ gas, whereby the surface of the donor substrate was fluorinated to form a mold-releasing layer 401.

[2] Formation of Thin Film on Donor Substrate and Patterning Thereof: Using the film-forming device 1, a polycrystalline Si thin film 402 was formed by LPCVD (low-pressure chemical vapor deposition) on the donor substrate having formed on the surface thereof the mold-releasing layer 401. Film thickness was constantly monitored with a quartz oscillator thickness meter during the deposition, and film formation was terminated when the film thickness reached 160 $\mu$m. It should be noted that, as a result of inspecting the surface with an atomic force microscope, film thickness unevenness in the surface of the obtained Si thin film was within ±0.2 $\mu$m.

Next, the four sets of film parts 4a, 4b, 4c, and 4d corresponding to each layer shape of the photonic crystal 4 were formed, as shown in FIGS. 4B and 4C, by ordinary photolithography using the patterning device 2. That is, a positive photoresist was spin-coated on the surface of the formed Si thin film 402 via the mold-releasing layer 401 on the donor substrate 401, the photoresist was exposed via a photomask, and the exposed portions of the photoresist were removed with a solvent. Thereafter, the portions that the thin film 402 exposed were etched by reactive ion etching. Thereafter, the non-exposed photoresist was removed with a remover to obtain the four sets of thin-film parts to which patterning had been applied. It should be noted that, as shown in FIG. 4C, plural alignment marks 403 used for positioning the donor substrate 400 in the next step were also formed in the patterning step.

[3] Supply of Adhesive Matrix Material and Functional Material to Thin Film: A solution in which a charge-transporting polyester (75 parts by weight), which served as the adhesive matrix material, a fluorescent dye Al quinolinium complex $Alq_3$ (25 parts by weight), which served as the functional material, and 70 parts by weight of THF had been dissolved was coated on the patterned thin film by casting. Then, the thin film was dried for one hour at 120° C. under reduced pressure.

Figure 5A:
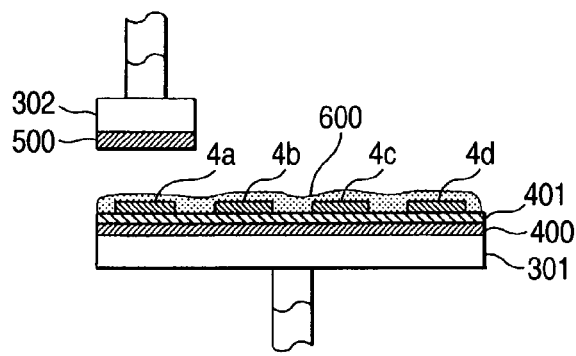
FIGS. 5A to 5F are pattern diagrams illustrating an example of a transfer step in the invention.

[4] Lamination Transfer Step: FIGS. 5A to 5F are pattern diagrams illustrating the lamination and transfer step. As shown in FIG. 5A, the donor substrate 400, including the thin film that was patterned and covered with a mixture 600 of the adhesive matrix material and the functional material, was disposed on the substrate holder 301 of the transfer device 3, and the Si wafer serving as the acceptor substrate 500 was disposed on the stage 302 of the transfer device 3.

Adjustment of the alignment of the acceptor substrate 500 with the donor substrate 400 was conducted using the alignment marks 403 (see FIG. 4). That is, the x-axis motor and the y-axis motor were controlled, the stage 302 was moved in the x direction and in the y direction, a mark detection signal from the mark detection unit 306 was taken in, the relative positional relationship between the alignment marks 403 and the acceptor substrate 500 was measured on the basis of the mark detection signal, and the x-axis motor, the y-axis motor and the θ motor were controlled on the basis of the results of measuring the relative positional relationship so that the alignment marks 403 and the acceptor substrate 500 reached the starting point positions. Thus, even if there is deviance in the position at which the donor substrate 400, which has the thin film formed thereon, is disposed, relative positioning of the acceptor substrate 500 with the alignment marks 403 can be conducted precisely.

Figure 5D:
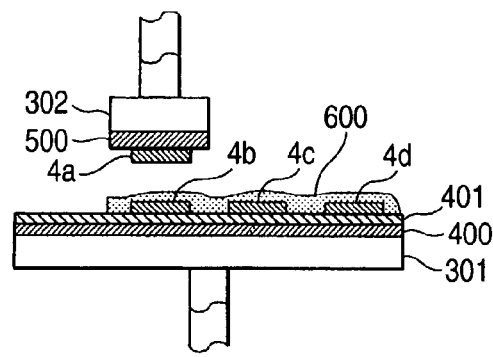
Figure 5B:
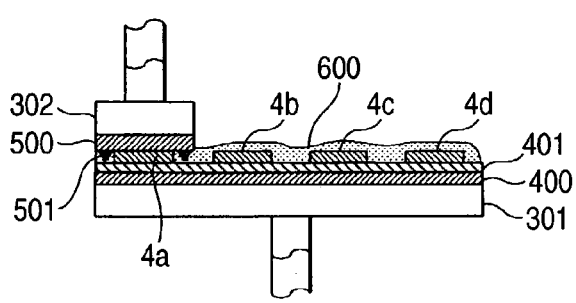

As shown in FIG. 5B, the z-axis motor was controlled on the basis of a detection signal of the z-axis position detection unit to raise the substrate holder 301, the surface of the thin film part 4a was brought into contact with the surface of the acceptor substrate 500, the acceptor substrate 500 was pressed with a predetermined load (in the present example, 1.5 kgf/cm$^2$) for a predetermined period of time (in the present example, 5 min.) while the acceptor substrate 500 was heated with a resistive heater (not illustrated) attached to the stage 302, then heating was stopped, and the acceptor substrate was allowed to cool to room temperature. Due to this process, the charge-transporting polyester to which the fluorescent dye had been added was thermoplastically deformed and filled into the pattern pores of the woodpile structure defined by the Si stripes, and the Si stripes were adhered to the acceptor substrate surface by the adhesive power of the polyester in a state in which the Si stripes were integrally joined.

Figure 5E:
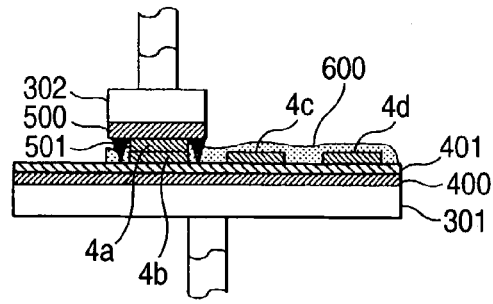
Figure 5C:
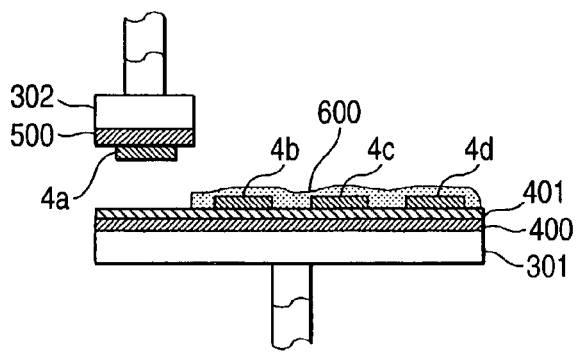

Next, as shown in FIGS. 5B and 5C, a cutter 501 attached to the four edges of the stage 302 was pushed down, the z-axis motor was driven on the basis of the detection signal of the z-axis position detection unit, and the substrate holder 301 was lowered to the original position shown in FIG. 5A. When the substrate holder 301 was lowered, the adhesive force between the thin-film part 4a and the acceptor substrate was far greater than the adhesive force between the thin-film part 4a and the mold-releasing layer, and the thin-film part 4a was separated from the donor substrate 400 and transferred to the acceptor substrate 500 because the polyester at the contour portion of the thin-film part 4a was cut by the cutter.

Figure 5F:
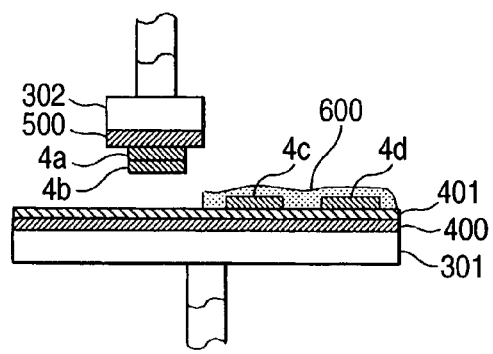

Next, as shown in FIG. 5D, the x-axis motor and the y-axis motor were controlled, and the stage 302 was moved onto the thin-film part 4b. Then, as shown in FIG. 5E, the z-axis motor was controlled on the basis of the detection signal of the z-axis position detection unit to raise the substrate holder 301, the surface of the thin-film part 4b was brought into contact with the surface of the acceptor substrate 500, and operations similar to the above were conducted. Next, similar to the above, the cutter 501 was pushed down, and the substrate holder 301 was lowered to the original position as shown in FIG. 5F.

Thereafter, each of the thin-film parts was similarly successively laminated and transferred, whereby the target woodpile-like photonic crystal 4 comprising the Si, the organic polymer compound, and the fluorescent material was obtained. It should be noted that the thickness of each stripe was 120 $\mu$m and the period of the stripes was 420 $\mu$m.

As described above, the photonic crystal, in which the functional material was finally homogenously filled into the fine 3-dimensional pores of the woodpile structure, avoided the difficulty of filling the functional material into the fine 3-dimensional pores, and could be created by an extremely simple method in which the functional material was coated onto the patterned thin-film by casting.

In the present example, a case was illustrated in which only the substrate holder 301 was moved in the z direction. However, the invention may be configured so that both the substrate holder 301 and the stage 302 are moved in the z direction. The invention may also be configured so that the substrate holder 301 is moved in the x direction and the y direction and the stage 302 is moved in the z direction. Moreover, the invention may also be configured so that both the substrate holder 301 and the stage 302 are moved in the x direction, the y direction, and the z direction. Also, in the present example, the formation of the thin film and patterning were conducted together. However, film formation and patterning may also be successively conducted for each thin-film part. Also, in the present example, heating was conducted by resistive heating. However, heating may also be conducted by a method such as high-frequency induction heating, infrared irradiation heating, and thermal head heating. It should be noted that, although thermoplastic polyester having a thermocompression property was used as the adhesive matrix material, in a case where an ultraviolet-curable resin is used, it is necessary to add an ultraviolet irradiation device in place of the heating device.

EXAMPLE 2

The target woodpile-like photonic crystal 4 comprising Si, an organic-inorganic compound sol-gel material, and a nonlinear material was obtained in the same manner as in example 1 except that, in step [3] of example 1, the adhesive matrix material was changed to phenyltriethoxysilane (95 parts by weight), which is a type of organic-inorganic composite sol-gel material, the functional material was changed to Disperse Red 1 (5 parts by weight), which is a type of nonlinear optical material, the solvent was changed to a THF/EtOH mixed solvent (4:1), and the drying conditions were changed to 100° C. for 10 minutes under an atmosphere, and annealing was performed for 1 hour at 180° C. under reduced pressure.

EXAMPLE 3

Figure 6:
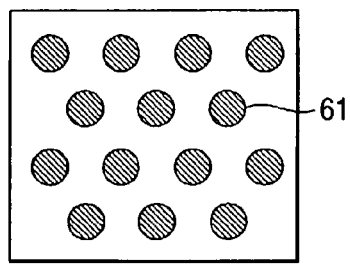
FIG. 6 is a view illustrating an example of a thin-film pattern of a triangular photonic crystal.

FIG. 6 is a view illustrating an example of a thin-film pattern of a triangular two-dimensional photonic crystal. In this example, as is illustrated, a thin film 61 is formed in a triangular symmetry. This kind of thin film pattern is disclosed in FIG. 1 of J. Appl. Phys., Vol. 86, p. 3503. The film thickness of the triangular photonic crystal was changed to 1 $\mu$m, thin-film parts corresponding to ones in which the photonic crystal was cut at even intervals into four layers were prepared, and the triangular photonic crystal was created in the same manner as in example 1. A commercially available UV-curable epoxy resin was used as the thin film material, ARTON resin (75 parts by weight) made by JSR was used as the adhesive matrix material, and $Alq_3$ (24 parts by weight) and a laser dye DCM (1 part by weight) were used as the functional material.

According to the invention, a two-dimensional structure having a high aspect ratio that was difficult to create in conventional methods can easily be created, as illustrated in the present example, by laminating the thin-film parts corresponding to layers into which the structure was cut.

COMPARATIVE EXAMPLE 1

Figure 7A:
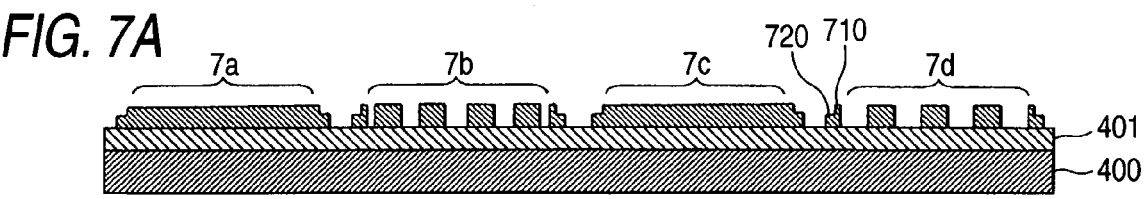
FIG. 7 are pattern diagrams illustrating another example of the patterning step, with FIG. 7A being a cross-sectional view and FIG. 7B being a plane view.
Figure 7B:
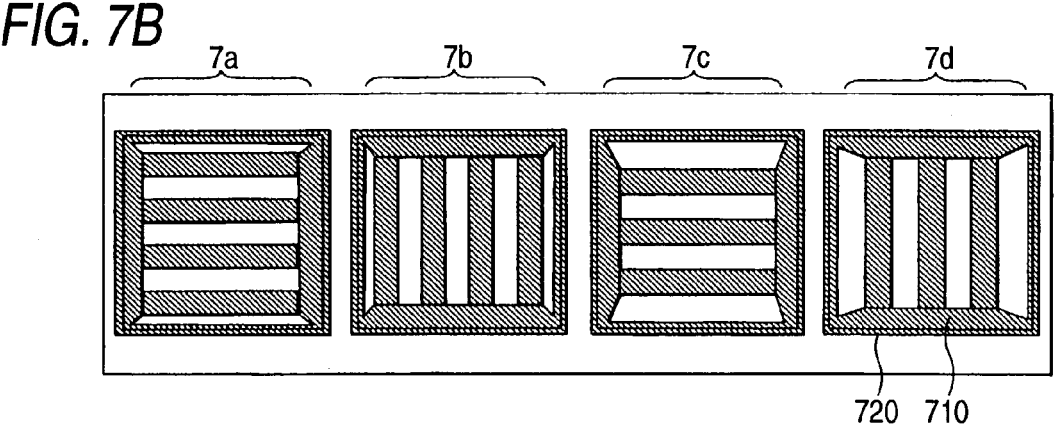

FIG. 7 are pattern diagrams illustrating another example of the patterning step, with FIG. 7A being a cross-sectional view and FIG. 7B being a plane view. As is illustrated, a joining frame 710 is disposed at each of thin-film parts 7a to 7d. In the present example, nothing is filled into the pattern pores of each of the thin-film parts 7a to 7d. The frame 710 of each thin-film part is adhered with an adhesive organic material. As is illustrated, the adhesive organic material is disposed by ink jetting at cutout portions 720 disposed at an outer side of the frame of each thin-film part. A woodpile photonic crystal was created in the same manner as in example 1, except that, in this production method, nothing was filled into the pores of the woodpile structure. In order to fill the adhesive matrix material and functional material used in example 1 into the 3-dimensional pores of the woodpile-like photonic crystal (hereinafter abbreviated as A), A was immersed in a solution (hereinafter abbreviated as B) in which the adhesive matrix material and the functional material prepared in example 1 were dissolved, to thereby fill B into the pores. Although B was homogenously filled into the pores of A, foam was generated when drying was conducted in order to remove unnecessary solvent. As a result, only a non-homogenous filled body could be obtained. In order to avoid problems associated with removing this solvent, a melt in which a mixture of the adhesive matrix material and the functional material was melted and fluidized was cast onto A to fill in the pores of A. However, the viscosity of the melt was high, it was difficult for the melt to penetrate the fine pores, and a homogenous filled body could not be obtained with this method either.

EXAMPLE 4

Figure 8:
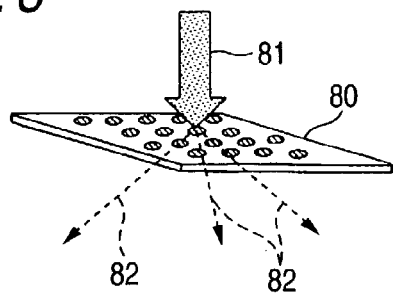
FIG. 8 is a view illustrating an example of a functional element using the triangular photonic crystal.

FIG. 8 is a diagram illustrating an example of a functional element using the triangular photonic crystal obtained in example 3. This photonic crystal 80 was irradiated with a nitrogen laser 81 (wavelength=337 nm; pulse width=about 5 nsec.; intensity=about 300 $\mu J/cm^2$) in a manner similar to that illustrated in FIG. 4 of J. Appl. Phys., Vol. 86, p. 3505, the entire content of this reference being incorporated herein by reference. Light 82 emitted together with this was measured with a photodetector. A sharp emission peak (about 63 nm) corresponding to the DCM laser oscillation was observed at a transmission threshold of about 50 $\mu J/cm^2$. Thus, it was confirmed that the functional element using the photonic crystal functioned effectively as a laser element.

According to the present invention, a useful and novel photonic crystal that homogenously incorporates a functional material can be obtained. Moreover, a method of producing a photonic crystal that can create, easily and inexpensively, such a photonic crystal is realized, and a useful and novel functional element using these can be obtained.

What is claimed is:
1. A photonic crystal comprising:
   a plurality of elements having predetermined patterns and laminated;
   an adhesive matrix material; and
   a functional material which is induced at least one of an alternation of physical property and an alternation of structure in response to an external stimulus,
   wherein the adhesive matrix material and the functional material are filled in pattern pores of the plurality of elements.

2. The photonic crystal of claim 1, wherein the induced alteration of physical property in the functional material is an alteration of at least one of refractive index, dielectric constant, absorption intensity, absorption spectrum, and electric conductivity.

3. The photonic crystal of claim 1, wherein the functional material includes at least one of a light-emitting material, a nonlinear optical material, an electrochromic material, a thermochromic material, a photochromic material, and a smart gel material.

4. The photonic crystal of claim 3, wherein the light-emitting material is a fluorescent organic dye.

5. The photonic crystal of claim 1, wherein material of the elements is selected from a group consisting of a metal, a ceramic, an inorganic semiconductor, and a crosslinking organic material.

6. The photonic crystal of claim 1, wherein the adhesive matrix material is an organic polymer compound.

7. The photonic crystal of claim 1, wherein the adhesive matrix material is an organic-inorganic composite sol-gel material.

8. A photonic crystal comprising:
   a plurality of elements having a predetermined pattern and laminated;
   an adhesive matrix material which is induced at least one of an alternation of physical property and an alternation of structure in response to an external stimulus,
   wherein the adhesive matrix material are filled in pattern pores of the plurality of elements.

9. A method of producing a photonic crystal, the method comprising:
   forming a plurality of elements having predetermined patterns on a donor substrate;
   supplying an adhesive matrix material and a functional material which is induced at least one of an alternation of physical property and an alternation of structure in response to an external stimulus; and
   successively separating by an acceptor substrate, from the donor substrate, each of elements to which the adhesive matrix material and the functional material have been supplied, and laminating and transferring each of elements onto the acceptor substrate.

10. The production method of claim 9, wherein, in the supplying step, the functional material is supplied in one of a state in which the functional material is solubilized in the adhesive matrix material and a state in which the functional material is dispersed in the adhesive matrix material.

11. The production method of claim 9, wherein, in the laminating and transferring step, at least one of light irradiation, heating, and pressurization is conducted.

12. The production method of claim 9, further comprising:
   forming a mold-releasing layer on a surface of the donor substrate.

13. A method of producing a photonic crystal, the method comprising:
   forming a plurality of elements having predetermined patterns on a donor substrate;
   supplying an adhesive matrix material which is induced at least one of an alternation of physical property and an alternation of structure in response to an external stimulus; and
   successively separating by an acceptor substrate, from the donor substrate, each of elements to which the adhesive matrix material has been supplied, and laminating and transferring each of elements onto the acceptor substrate.

14. A functional element comprising:
   a photonic crystal including:
   a plurality of elements having predetermined patterns and laminated;
   an adhesive matrix material; and
   a functional material which is induced at least one of an alternation of physical property and an alternation of structure in response to an external stimulus,
   wherein the adhesive matrix material and the functional material are filled in pattern pores of the plurality of elements.

* * * * *